United States Patent [19]

McHugh et al.

[11] Patent Number: 4,552,749
[45] Date of Patent: Nov. 12, 1985

[54] PROCESS FOR THE PRODUCTION OF MOLYBDENUM DIOXIDE

[75] Inventors: Lawrence F. McHugh, Fairfield, Conn.; Dale K. Huggins; Malcolm T. Hepworth, both of Golden, Colo.; John M. Laferty, Wheat Ridge, Colo.

[73] Assignee: AMAX Inc., Greenwich, Conn.

[21] Appl. No.: 690,708

[22] Filed: Jan. 11, 1985

[51] Int. Cl.⁴ .............................................. C01G 39/02
[52] U.S. Cl. ....................................... 423/606; 423/53
[58] Field of Search ................................... 423/53, 606

[56] References Cited

U.S. PATENT DOCUMENTS

| 3,336,100 | 8/1967 | Cloppet ............................. 423/606 |
| 3,941,867 | 3/1976 | Wilkominsky et al. ............ 423/606 |
| 4,034,969 | 7/1977 | Grimes ................................. 266/82 |
| 4,462,822 | 7/1984 | Sabacky et al. ..................... 423/606 |

FOREIGN PATENT DOCUMENTS 588188  1/1978  U.S.S.R. ............................. 423/606

Primary Examiner—Herbert T. Carter
Attorney, Agent, or Firm—Michael A. Ciomek; Eugene J. Kalil

[57] ABSTRACT

A process is provided for converting $MoS_2$ to $MoO_2$ wherein, $MoS_2$ in particulate form is fed into a reactor while flowing $MoO_3$ vapor therein to effect reaction thereof with $MoS_2$ to form $MoO_2$. The temperature in the reactor is maintained at a level sufficient to cause the reaction to go forward. A portion of the $MoO_2$ is removed from the reactor as a product and the remainder is selectively oxidized at a temperature sufficient to generate gaseous $MoO_3$ which is recycled to the reactor relative to the flow of $MoS_2$ therein to convert the $MoS_2$ to $MoO_2$.

16 Claims, 4 Drawing Figures

PROCESS FOR THE PRODUCTION OF MOLYBDENUM DIOXIDE

This invention relates to the production of $MoO_2$ from $MoS_2$ characterized by low sulfur and $MoO_3$ levels.

STATE OF THE ART

It is known to oxidize $MoS_2$ to $MoO_2$ by reacting it with $MoO_3$. Finely divided $MoO_3$ and $MoS_2$ are mixed together in the ratio of about seven or more moles of $MoO_3$ to one mole of $MoS_2$. This mixture is then heated to 600° C.–700° C. in a closed chamber where $SO_2$ is evolved. The $MoO_2$ product is then desulfurized at 400° C.–600° C. in an atmosphere containing 10% or less $SO_2$ and thereafter cooled in a neutral or reducing atmosphere to 250° C. Other methods for producing $MoO_2$ have involved reducing $MoO_3$ with $H_2$, $NH_3$ or carbon.

One embodiment for producing $MoO_2$ by reacting $MoO_3$ with $MoS_2$ is disclosed in U.S. Pat. No. 3,336,100. The process as claimed comprises mixing $MoO_3$ with $MoS_2$ to provide a uniform mixture containing substantially stoichiometric amounts of the reactants.

The mixture is reacted at a temperature between 600° C. and 700° C. in a closed chamber to evolve $SO_2$. The pressure in the chamber is maintained at slightly above atmospheric pressure to prevent air from entering the chamber and form a product having a low sulfuric content. The desulfurization is carried out in an atmosphere containing less than 10% $SO_2$ and at a temperature substantially between 400° C. and 600° C. to obtain $MoO_2$. Following the reaction, the molybdenum dioxide ($MoO_2$) is cooled at least to 250° C. under either a neutral or a reducing atmosphere.

Reducing $MoO_3$ with $H_2$ or $NH_3$ is very expensive and reactions with solid reductants usually produce an impure product. Reacting $MoS_2$ and $MoO_3$ at 600° C.–700° C. is a slow reaction which requires two hours or longer and which results in a product which must be treated to desulfurize to an acceptable sulfur value. It also requires several furnaces for the different $SO_2$ levels which are maintained in the gas. Another disadvantage is that a 25% or more stoichiometric excess of $MoO_3$ must be used in order to obtain a low sulfur product. Thus the product is generally not $MoO_2$ per se but a mixture of $MoO_2$ and $MoO_3$.

It would be desirable to provide a process for producing $MoO_2$ from $MoS_2$ which is fast, efficient and which provides a product which is low in sulfur and in retained $MoO_3$.

OBJECTS OF THE INVENTION

It is an object of the invention to provide a process for efficiently converting $MoS_2$ to $MoO_2$.

Another object of the invention is to provide a process in which $MoS_2$ is easily converted to $MoO_2$ by reacting it with $MoO_3$ in the vapor state.

These and other objects will more clearly appear when taken in conjunction with the following disclosure, the claims and the accompanying drawings.

IN THE DRAWINGS

SUMMARY OF THE INVENTION

Broadly speaking, the invention is directed to a process for converting $MoS_2$ to $MoO_2$ wherein particulate $MoS_2$ is fed into a reactor which is provided with a flow of $MoO_3$ vapor, the temperature of the reactor being maintained at a level sufficient to cause $MoS_2$ to react with $MoO_3$ to form $MoO_2$ and $SO_2$. As the reaction proceeds to completion, a portion of the $MoO_2$ formed is removed as the product while the remainder portion is oxidized to form $MoO_3$ vapor which is caused to react with addition $MoS_2$ feed material. The process is preferably continuous.

In a preferred embodiment, the $MoO_3$ vapor is caused to flow counter to the $MoS_2$ feed material in the thermal reactor, thereby avoiding external recycle of $MoO_3$. Moreover, enthalpy is transferred from the combustion zone (where a portion of the $MoO_2$ is oxidized to $MoO_3$ vapor) to an endothermic zone where the $MoO_3$ vapor reacts with $MoS_2$. However, the reaction of $MoO_3$ with $MoS_2$ is sufficiently exothermic to sustain the temperature in the reactor to within the desired range.

Thus, by coupling these reactions (i.e., the oxidation of $MoS_2$ to $MoO_3$ and the recycling of $MoO_3$ as vapor), good temperature control is possible without the addition of external heat. The reaction temperature of $MoS_2$ with $MoO_3$ is controlled to range from about 750° C. to 950° C.

DETAILS OF THE INVENTION

Figure 1:
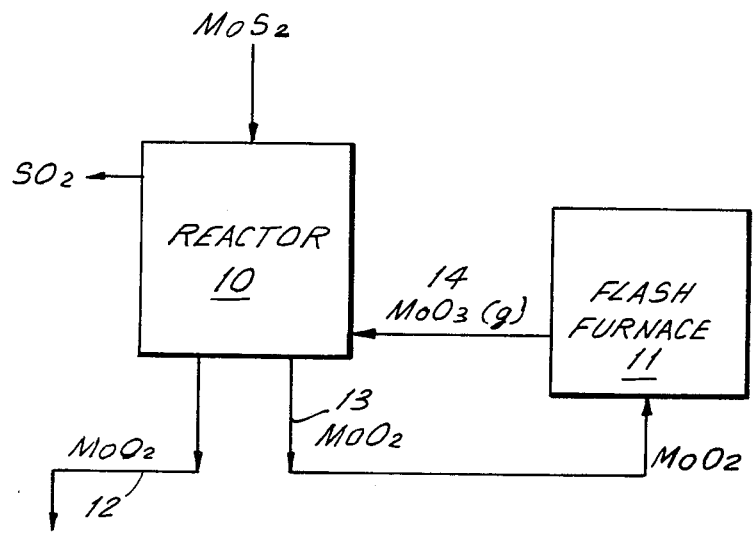
FIG. 1 is a block diagram illustrating schematically one mode for carrying out the invention.

Referring to FIG. 1, a block diagram is shown illustrating schematically one embodiment for carrying out the invention. $MoS_2$ is fed to reactor 10 where it is oxidized at the appropriate temperature to form $MoO_2$ by recycle $MoO_3$ fed to the reactor from flash furnace 11. As will be noted, a portion of the $MoO_2$ formed is removed as product 12, while the remainder portion 13 is removed and fed to flash furnace 11 where it is oxidized to $MoO_3$ vapor 14 which is recycled to reactor 10 as shown.

The operating temperature in the reactor to achieve the results of the invention should be substantially in excess of 700° C., for example in the range of about 750° C. to 950° C., depending upon the vapor pressure of $MoO_3$ in the reactor. This will be evident by referring to FIG. 2 which is the PT diagram for $MoO_3$. At temperatures in excess of 750° C., $MoO_3$ in the vapor state is assured at vapor pressures in excess of several mm of mercury (e.g.; 3 mm and higher) and ranging up to 40 mm and higher of mercury (Hg), the partial pressure of $MoO_3$ being substantially directly related to the temperature.

One method for producing $MoO_3$ vapor is by the flash sublimation of $MoO_2$ under oxidizing conditions, wherein $MoO_2$ is oxidized to $MoO_3$ vapor. A particularly useful method is disclosed in copending application Ser. No. 583,566 filed Feb. 27, 1984 and assigned to the same assignee. The aforementioned process comprises, feeding a pneumatically suspended stream of particulate molybdic oxide and a mixture of fuel and oxidizing gases through a nozzle into a confined furnace chamber, the fuel gas-oxidizing gas mixture exiting from the nozzle being ignited to provide a flame thereof. The flame is maintained at a condition to provide a temperature in the furnace chamber sufficient to oxidize and to sublime the oxidized molybdic oxide, the temperature employed being in excess of the sublimation temperature of molybdenum trioxide, e.g., in excess of about 950° C.

The resulting gases and the sublimed molybdenum trioxide are caused to flow from the furnace chamber to the next step for treatment. In this instance, the sublimed $MoO_3$ at elevated temperature is fed to the reactor where it reacts with $MoS_2$ to produce molybdenum disulfide. The temperature of the sublimed $MoO_3$ prior to entering the reactor generally ranges from about 1000° C. to 1200° C. to provide the necessary heat to carry out the reaction for the production of $MoO_2$, the temperature in the reactor ranging from about 750° C. to 950° C. By virtue of the reaction, more heat is evolved than put in.

The reaction for converting $MoO_2$ to $MoO_3$ in the flash furnace is as follows:

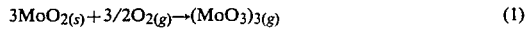

$$3MoO_{2(s)} + 3/2O_{2(g)} \rightarrow (MoO_3)_{3(g)} \qquad (1)$$

The reaction for oxidizing $MoS_2$ to $MoO_2$ is given below:

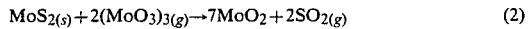

$$MoS_{2(s)} + 2(MoO_3)_{3(g)} \rightarrow 7MoO_2 + 2SO_{2(g)} \qquad (2)$$

Since $MoO_3$ is the oxidant, a blanket of inert gas is preferably used in carrying out the reaction. This enables the production of $SO_2$ of sufficient strength for use in an acid plant or for the production of $SO_2$ liquid. In the latter instance, $SO_2$ would be recycled and oxygen would be used as the oxidant rather than air.

Figure 3:
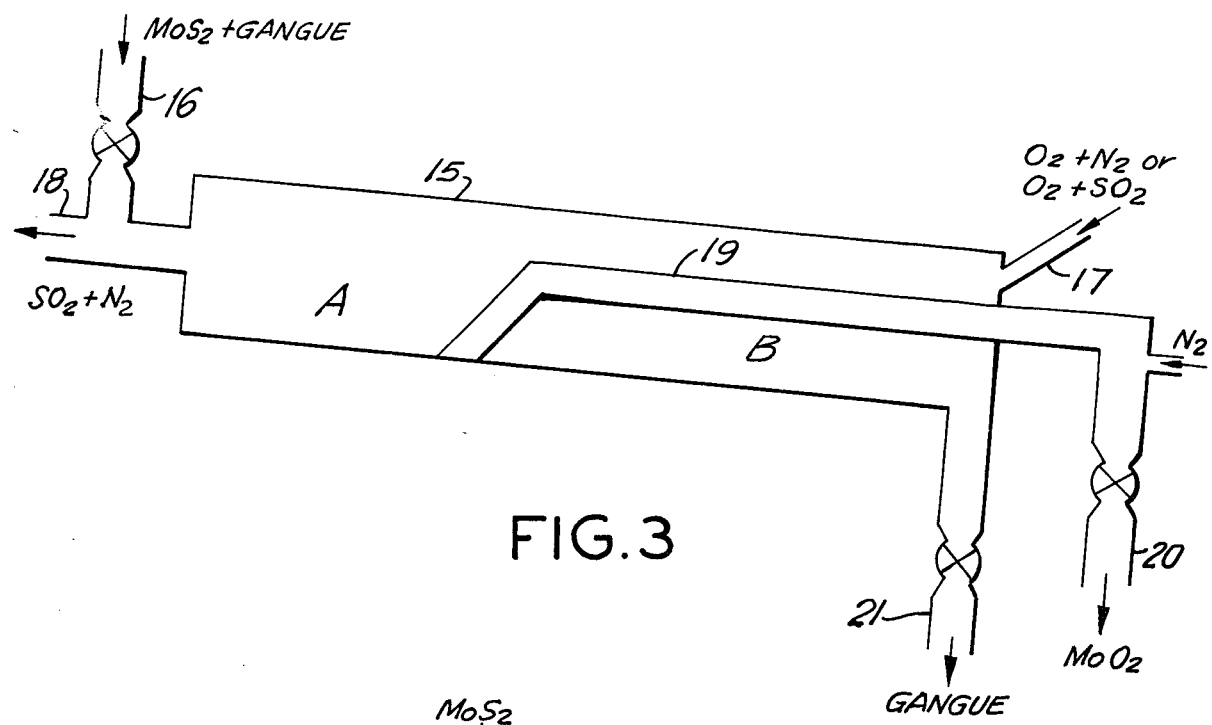
FIG. 3 illustrates schematically a rotary furnace which may be used in carrying out the invention.

Another embodiment for carrying out the invention resides in the use of an inclined rotary kiln of the type shown in the schematic of FIG. 3. The feed comprising $MoS_2$ and gangue is fed into reactor 15 at 16 with $O_2$ and $N_2$ or $O_2$ and $SO_2$ gases being fed countercurrently at gas inlet 17, the $MoS_2$ being oxidized in Zone A to form $MoO_2$ as the reaction product. The reaction product flows down the kiln, with the $SO_2$ formed by oxidation flowing with the inert purge gas ($N_2$) out of exit port 18 to an acid plant.

When $SO_2$ is fed into inlet 17, the amount is less than 10% of the gases fed into the kiln, the $SO_2$ being recyle $SO_2$ which is obtained as a portion of the $SO_2$ leaving the kiln at exit 18.

A portion of the $MoO_2$ product is removed by a central splitter tube 19 and caused to exit at 20. The remainder of the $MoO_2$ product flows to Zone B in the annular portion of the kiln which is maintained at a temperature in excess of the vaporization temperature for $MoO_3$, the $MoO_2$ being converted to $MoO_3$ by virtue of the oxygen flowing into the rotary kiln or reactor at inlet port 17. The $MoO_3$ vapor flows countercurrent to the flow of the feed and reacts with the feed in Zone A by virtue of the enthalpy in the $MoO_3$ vapor. The temperature of the $MoO_3$ vapor generated in Zone B ranges from about 750° C. to 950° C. Following vaporization, the gangue flows out of the rotary kiln via exit port 21.

A back purge of inert, e.g., $N_2$, may be provided to accomplish: (1) volatization of any excess $MoO_3$ as $MoO_3$ vapor; and (2) purge it of any adsorbed $SO_2$ and to remove traces of any volatile sulfur compounds. The split between $MoO_2$ to exit tube 19 and $MoO_2$ to the annular section of the rotary kiln is approximately 7 gram atoms of molybdenum to the annulus and 1 gram atom to exit tube 19.

While Reaction (1) hereinabove shows the volatized $MoO_3$ as a trimer of $(MoO_3)_3$, the literature indicates that many polymeric vapor species exist. The oxygen required for Reaction (1) is supplied by air, air plus nitrogen, air plus $SO_2$, oxygen plus nitrogen, enriched air plus nitrogen, or any combination thereof. In order to avoid a liquid phase of $MoO_3$, the temperature or partial pressure must be controlled as shown by the PT diagram of FIG. 2.

Figure 2:
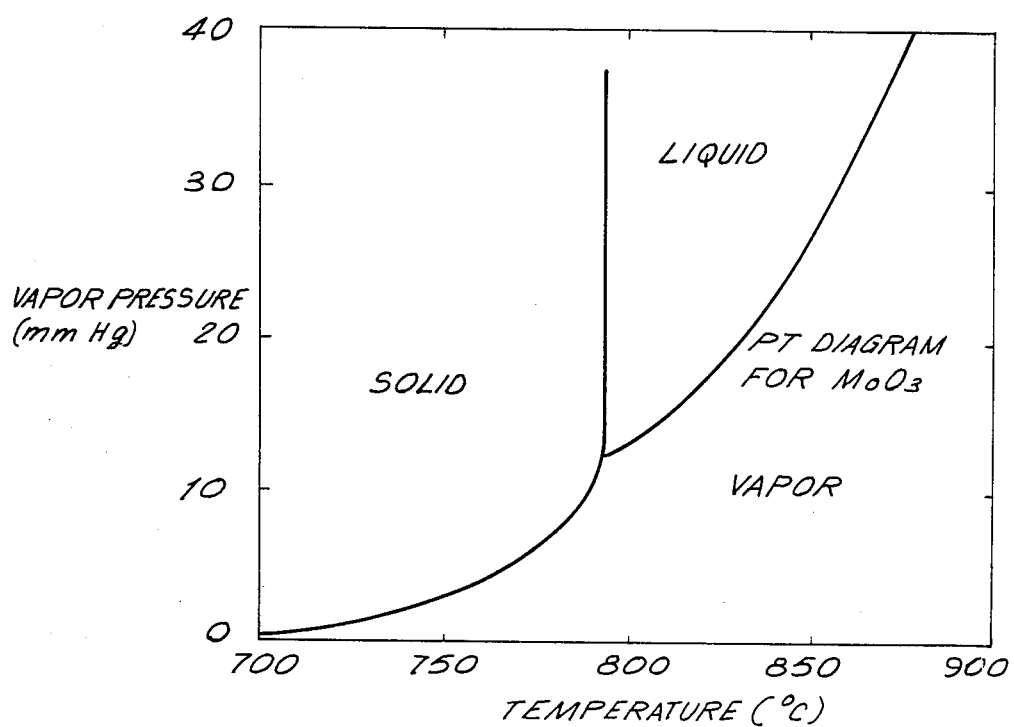
FIG. 2 is a PT diagram showing the various states, i.e., solid, liquid and vapor, in which $MoO_3$ may exist depending on vapor pressure and the temperature at said pressure.

As stated hereinbefore, the area shown as the vapor phase in FIG. 2 is the pressure-temperature operating range necessary for carrying out the process. This area includes the locus separating solid and vapor phases but does not include the locus separating the liquid and vapor phases.

The temperature at Zone B in the annular section of the rotary kiln (FIG. 3) when Reaction (1) takes place should not exceed the softening temperature of the gangue constituents collected therein so as to assure a free-flowing or a partially agglomerated solid, otherwise the gangue may get so tacky as to impede the flow thereof out of exit port 21. The maximum temperature can be determined easily by experiment. The counterflow of combustion gases into the kiln will tend to cool the gangue constituents and thus inhibit softening, the softening temperature of the gangue constituents being substantially higher than the sublimation temperature of $MoO_3$. In this process, approximately six-sevenths of the gangue in the original $MoS_2$ concentrate is removed. The $MoO_3$ vapor phase is swept countercurrent to the flow of $MoS_2$ in the kiln to reaction Zone A where Reaction (2) occurs.

Several laboratory tests were conducted comparing the invention with the process commonly employed in the prior art. In one test, a mixture was prepared in which the ratio of $MoO_3$ to $MoS_2$ was controlled at 6.5 moles $MoO_3$ to 1 mole $MoS_2$. The mixture was charged into a quartz tube heated to 700° C. and held at temperature for 3 hours while flushing the quartz tube with an inert gas, i.e., argon. The reacted charge was then cooled quickly to room temperature in 30 minutes.

On examination, the reaction products comprised a powdery material and a large chunk or agglomeration of material in the center of the tube. This portion of the reaction mixture had apparently formed a liquid phase which solidified on cooling. The reaction of $MoS_2$ (solid) with $MoO_3$ (solid) to form $MoO_2$ (solid) and $SO_2$ (gas) is slightly endothermic.

Analysis of the powder showed that the sulfur content was still very high, i.e., 3–21%. The solid chunk, on the other hand, had a very low sulfur content of 0.034% as will be noted from the table below.

TABLE 1

| Sample #2 | Analyses wt % | | |
|---|---|---|---|
| | Total Mo | Total S | Mo as $MoO_3$ |
| Powder | 63.3 | 3.21 | 7.01 |
| Chunk | 61.6 | 0.034 | 15.9 |
| Weighted Average | 62.7 | 2.07 | 10.2 |

In another test, a similar reaction mixture was placed in the quartz tube and was held at 700° C. for 30 minutes and then at 800° C. for 30 minutes without argon flushing. For the next 30 minutes, the system was held at 900° C. with a flow of 7.5 liters/hour of argon gas passing through it, following which the mixture was then cooled in less than 45 minutes to room temperature. The mixture was then separated into four portions: (1) a center −35 mesh fraction, (2) a center +35 mesh fraction, and two end portions. The results are given below.

TABLE 2

| Sample #1 | Analyses, wt % | | |
|---|---|---|---|
| | Total Mo | Total S | Mo as MoO$_3$ |
| Center +35 Mesh | 64.2 | 0.005 | 12.1 |
| Center −35 Mesh | 61.8 | 0.025 | 13.2 |
| Upflow End | 63.5 | 0.010 | 11.9 |
| Downflow End | 63.1 | 0.012 | 12.1 |
| Weighted Average | 63.1 | 0.014 | 12.4 |

As will be apparent, low sulfur products are easily obtainable by this method. The high MoO$_3$ content indicates that either the argon flow or the temperature was not high enough, or the time long enough, to vaporize the MoO$_3$ and move it to the downflow end of the tube.

In a third sample, the same mixture was heated directly to 800° C. and held between 800° C. and 900° C. for 30 minutes with no argon flush. Following this step, the mixture was then held between 900° C. and 950° C. for 30 minutes under an argon flow of 30 liters/minute after which the system was cooled. At the end of the test it was noted that MoO$_3$ had condensed in the tube outside the heated area on the downflow end of the reactor. The results are set forth in the table below.

TABLE 3

| Sample #3 | Analyses, wt % | | |
|---|---|---|---|
| | Total Mo | Total S | Mo as MoO$_3$ |
| Center +35 Mesh | 69.8 | 0.005 | 0.287 |
| Center −35 Mesh | 68.2 | 0.015 | 0.426 |
| Upflow End | 66.7 | 0.038 | 0.627 |
| Downflow End | 64.8 | 0.040 | 4.71 |

Tests were conducted at various temperatures in a rotary kiln wherein 6.65 moles of MoO$_3$ were blended with one mole of MoS$_2$ and calcined in a rotary kiln under argon for two hours. The variation in sulfur content (wt. %) with temperature of calcining will be apparent from the table below.

TABLE 4

| Tests | Temp °C. | % Mo | % MoO$_3$ | % MoS$_2$ | % MoO$_2$ | % S |
|---|---|---|---|---|---|---|
| A | 500 | 63.0 | 66.60 | 8.52 | 14.5 | 5.11 |
| B | 650 | 67.2 | 5.40 | 0.40 | 84.3 | 0.16 |
| C | 700 | 67.2 | 6.46 | <0.01 | 83.9 | 0.004 |
| D | 750 | 65.2 | 2.50 | 0.09 | 84.6 | 0.034 |

In carrying out the invention using MoO$_3$ vapor as the reactant, it is important that the temperature exceed 750° C., e.g. at least about 800° C., and preferably range from about 850° C. to 1000° C. It is preferred that an inert gas be used as a gas blanket, such as Ar and N$_2$.

The gas entering the reactor may comprise a combination of O$_2$ plus N$_2$, O$_2$ plus SO$_2$, or O$_2$ plus Ar. For economic reasons, N$_2$ is preferred. Where SO$_2$ is used as a blend with O$_2$, the level of oxygen should be sufficient and high enough to provide reasonable rates of transport to the site of reaction.

The invention may be carried out in any apparatus in which the reaction between MoS$_2$ and MoO$_3$ can be effected. For example, a multiple hearth furnace can be employed of the type disclosed in U.S. Pat. No. 4,034,969. As described in the patent, the product produced is solid MoO$_3$. However, the temperature profile of the multiple hearth furnace can be controlled such that the MoO$_3$ produced in the lower hearths can be in the vapor state for recycle to the upper hearths to react directly with MoS$_2$ to produce MoO$_2$ which is continually removed from the middle hearths in the furnace as the final product.

Figure 4:
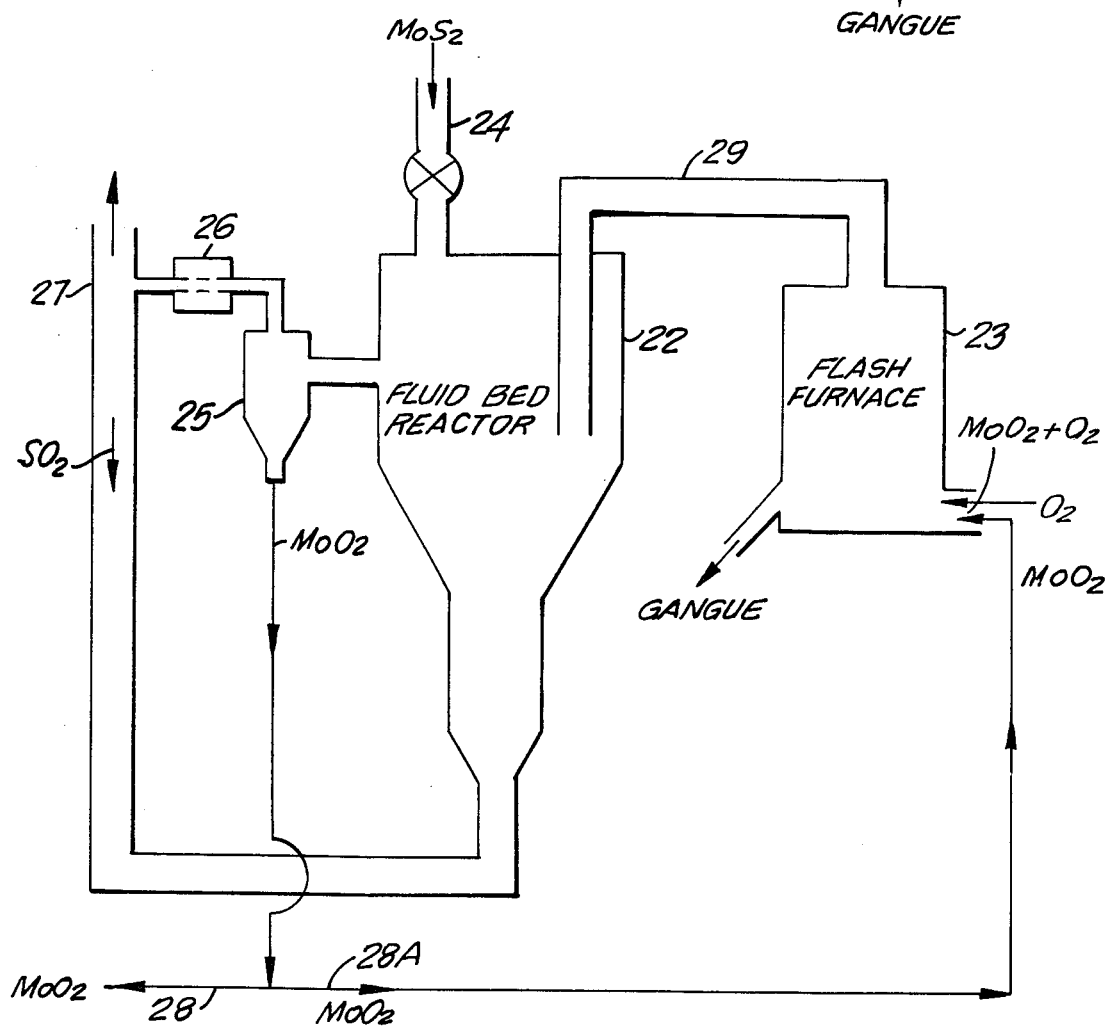
FIG. 4 shows schematically in combination a reactor and a flash furnace for vaporizing $MoO_3$ which may be used in carrying out the invention.

Another apparatus which may be employed includes a fluid bed reactor combined with a flash furnace for converting a portion of the MoO$_2$ product to MoO$_3$ vapor for recycle to the fluid bed roaster. As illustrative of such a two-stage process, reference is made to FIG. 4 which shows a fluid bed reactor 22 coupled to a flash furnace 23. A fluid bed of MoO$_2$ is provided in reactor 22 to which particulate MoS$_2$ is fed via inlet port 24. MoO$_2$ formed during the reaction is removed via a cyclone 25 with SO$_2$ going through heat exchanger 26 with a portion going to outlet 27 and the remaining portion recycled to reactor 22 to maintain the fluid bed.

The MoO$_2$ removed from cyclone 25 is split to provide final product 28 and recycle MoO$_2$ (28A) which is directed to flash furnace 23 where, together with oxygen, it is fed to a gas burner (not shown) for conversion to (MoO$_3$)$_3$ vapor which is fed via insulated tube 29 to fluid bed reactor 22 at a rate according to the requirements of the following reaction:

$$MoS_{2(s)} + 2(MoO_3)_{3(g)} \rightarrow 7MoO_2 + 2SO_{2(g)} \qquad (2)$$

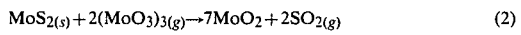

The flash furnace generally operates at about 1000° C. to 1700° C. (depending on whether a liquid gangue is desired) and the MoO$_3$ vapor in the fluid bed is at a temperature of about 800° C. to 1000° C. by virtue of recycle of cooled SO$_2$ into the reactor as shown. A preferred temperature in the reactor is about 850° C. to 950° C.

In summary, one embodiment of the invention is directed to a process for converting MoS$_2$ to MoO$_2$ in which particulate MoS$_2$ is fed to an inclined rotary kiln having a feed end and a discharge end with MoS$_2$ flowing downstream towards the discharge end during which it is oxidized to MoO$_2$ at a temperature of at least about 750° C. The temperature is controlled in the kiln such that the temperature in the region of the discharge end is in excess of about 750° C. sufficient to oxidize MoO$_2$ to MoO$_3$ vapor. The process includes the additional steps of splitting the MoO$_2$ formed at a region between the ends of the rotary kiln into two portions, wherein one portion is removed as product and the other portion allowed to enter the region of the discharge end for conversion by oxidation to MoO$_3$ vapor, causing the MoO$_3$ vapor to flow upstream in the kiln to react with feed MoS$_2$ and form MoO$_2$, and maintaining the flow of MoS$_2$ and MoO$_3$ in the kiln, whereby a low sulfur MoO$_2$ product is produced which is continuously removed from the kiln by a splitter.

The temperature in the region of the discharge end is controlled over the range of about 850° C. to 950° C. to assure the formation of MoO$_3$ vapor for reaction with MoS$_2$ feed to form MoO$_2$. The oxidizing atmosphere may comprise a gas mixture selected from the group consisting of O$_2$ plus N$_2$ and O$_2$ plus SO$_2$.

Another embodiment comprises providing a fluid bed reactor and maintaining therein a fluid bed of MoO$_2$ at a temperature sufficient to effect reaction of MoS$_2$ with MoO$_3$ vapor fed thereto. The steps include feeding the reactants MoS$_2$ and MoO$_3$ vapor to the fluid bed whereby the $MoO_3$ reacts with $MoS_2$ to form $MoO_2$, the rate of feed of said $MoO_3$ vapor to the rate of feed of said $MoS_2$ being such that the amount of $MoO_3$ is at least stoichiometrically sufficient to react with substantially all of the $MoS_2$ fed to the reactor. Following the reaction a stream of the $MoO_2$ produced is split into a first portion as the product and a second portion as a reactant which is recycled to a flash oxidation furnace to generate $MoO_3$ vapor by flash oxidation.

The generated $MoO_3$ vapor is recycled to the fluid bed reactor for reaction with said feed $MoS_2$, the process being continued whereby $MoO_2$ low in sulfur is obtained as a product thereof and $SO_2$ produced which is removed and recovered.

The temperature of the $MoO_3$ vapor leaving the flash furnace may range from about 850° C. to 1000° C. and the average temperature in the fluid bed reactor may range from about 750° C. to 950° C. The $SO_2$ produced during reaction in the fluid bed reactor is split and a portion of it recycled to the fluid bed reactor.

By using $MoO_3$ in the vapor state, the reaction goes to completion quickly and efficiently to produce a low sulfur product of $MoO_2$. By controlling the gas composition entering the reactor, $SO_2$ gas of relatively high concentration can be produced for use in the acid plant or for conversion into liquid $SO_2$.

Although the present invention has been described in conjunction with the preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for converting $MoS_2$ to $MoO_2$ which comprises,
   feeding $MoS_2$ in particulate form into a reactor while flowing $MoO_3$ vapor therein to effect reaction thereof with said $MoS_2$ to form $MoO_2$,
      the temperature in said reactor being maintained at a level sufficient to carry out the reaction,
   selectively removing from said reactor a portion of said $MoO_2$ as a product,
   selectively oxidizing the remainder of said $MoO_2$ at a temperature sufficient to generate gaseous $MoO_3$,
   and causing said generated gaseous $MoO_3$ to flow in said reactor relative to the flow of $MoS_2$ therein to convert said $MoS_2$ to $MoO_2$,
      the amount of $MoO_3$ being at least stoichiometrically sufficient to react with substantially all of the $MoS_2$.

2. The process of claim 1, wherein the reaction between $MoO_3$ vapor and $MoS_2$ is carried out under a blanket of inert gas.

3. The process of claim 1, wherein the reaction is carried out in a blended atmosphere selected from the group consisting of $O_2$ plus $N_2$ and $O_2$ plus $SO_2$.

4. The process of claim 1, wherein the reaction is carried out at a temperature exceeding about 750° C.

5. The process of claim 4, wherein the reaction is carried out at a temperature of about 850° C. to 950° C.

6. The process of claim 1, wherein the reaction is carried out by feeding particulate $MoS_2$ into a reactor while feeding hot $MoO_3$ vapor in counterflow thereto.

7. A process for converting $MoS_2$ to $MoO_2$ which comprises,
   feeding $MoS_2$ in particulate form into a reactor while countercurrently flowing hot $MoO_3$ vapor therein to effect reaction thereof with said $MoS_2$ to form $MoO_2$,
      the temperature of the $MoO_3$ fed to the reactor being maintained at a level sufficient to carry out the reaction,
   selectively removing from said reactor a portion of said $MoO_2$ as a product,
   selectively oxidizing the remainder of said $MoO_2$ at a temperature sufficient to generate gaseous $MoO_3$,
   and countercurrently flowing said generated gaseous $MoO_3$ in said reactor relative to the flow of $MoS_2$ therein to convert said $MoS_2$ to $MoO_2$,
      the temperature in said reactor due to the flow of $MoO_3$ vapor being in excess of about 750° C.

8. The process of claim 7, wherein the temperature in the reactor ranges from about 850° C. to 950° C.

9. The process of claim 7, wherein the reaction is carried out under a blanket of inert gas.

10. The process of claim 7, wherein the reaction is carried out by establishing a fluid bed of $MoO_2$ in the reactor, wherein $MoS_2$ is fed to the fluid bed and wherein $MoO_3$ vapor is fed to the fluid bed to react with $MoS_2$ and form $MoO_2$, a portion of which is removed as product and the remainder portion removed, converted by thermal oxidation to $MoO_3$ vapor and the vapor recycled to the fluid bed in the 11. A process for converting $MoS_2$ to $MoO_2$ which comprises,
   feeding particulate $MoS_2$ to an inclined rotary kiln having a feed end and a discharge end,
      said $MoS_2$ flowing downstream towards said discharge end during which it is oxidized to $MoO_2$ at a temperature of at least about 750° C.,
   controlling the temperature in said kiln such that the temperature in the region of the discharge end is in excess of about 750° C. sufficient to oxidize $MoO_2$ to $MoO_3$ vapor,
   splitting the $MoO_2$ formed at a region between the ends of the rotary kiln into two portions,
      whereby one portion is removed as product and the other portion allowed to enter the region of the discharge end for conversion by oxidation to $MoO_3$ vapor,
   causing said $MoO_3$ vapor to flow upstream in said kiln to react with feed $MoS_2$ and form $MoO_2$,
   and maintaining said flow of $MoS_2$ and $MoO_3$ in said kiln,
      whereby a low sulfur $MoO_2$ product is produced and continuously removed from the kiln by a splitter.

12. The process of claim 11, wherein the temperature in the region of the discharge end is controlled over the range of about 850° C. to 950° C. and thereby assure the formation of $MoO_3$ vapor for reaction with $MoS_2$ feed to form $MoO_2$.

13. The process of claim 11, wherein the oxidizing atmosphere comprises a gas mixture selected from the group consisting of $O_2$ plus $N_2$ and $O_2$ plus $SO_2$.

14. A process for converting $MoS_2$ to $MoO_2$ which comprises,
   providing a fluid bed reactor and maintaining therein a fluid bed of $MoO_2$ at a temperature sufficient to effect reaction of $MoS_2$ with $MoO_3$ vapor fed thereto, feeding the reactants $MoS_2$ and $MoO_3$ vapor to said fluid bed whereby the $MoO_3$ reacts with $MoS_2$ to form $MoO_2$, the rate of feed of said $MoO_3$ vapor to the rate of feed of said $MoS_2$ being such that the amount of $MoO_3$ is at least stoichiometrically sufficient to react with substantially all of said $MoS_2$, removing a stream of said $MoO_2$ as it forms and splitting said stream into a first portion as the product and a second portion as a reactant which is recycled to a flash oxidation furnace to generate $MoO_3$ vapor by flash oxidation, recycling said generated $MoO_3$ vapor to said fluid bed reactor for reaction with said feed $MoS_2$, and continuing said process, whereby $MoO_2$ low in sulfur is obtained as a product thereof and $SO_2$ produced which is removed and recovered.

15. The process of claim 14, wherein the temperature of the $MoO_3$ vapor leaving in the flash furnace ranges from about 850° C. to 1000° C. and the average temperature in the fluid bed reactor ranges from about 750° C. to 950° C.

16. The process of claim 14, wherein $SO_2$ produced during reaction in the fluid bed reactor is split and a portion of it recycled to the fluid bed reactor.

* * * * *